United States Patent [19]
Tanaka et al.

[11] Patent Number: 5,803,395
[45] Date of Patent: Sep. 8, 1998

[54] METHOD OF WINDING UP A TAPE AROUND A REEL

[75] Inventors: Kenji Tanaka; Yasuhiko Arake, both of Kyoto, Japan

[73] Assignee: Rohm Co., Ltd., Japan

[21] Appl. No.: 858,032

[22] Filed: May 16, 1997

[30]    Foreign Application Priority Data

May 21, 1996  [JP]  Japan .................................... 8-126110

[51] Int. Cl.⁶ ................................................ B65H 19/28
[52] U.S. Cl. ..................................... 242/532.5; 242/586.4
[58] Field of Search .............................. 242/532.5, 579, 242/586, 586.2, 586.4, 586.5

[56]            References Cited

U.S. PATENT DOCUMENTS

| | | | |
|---|---|---|---|
| 1,216,967 | 2/1917 | Dunavant | 242/586.4 |
| 2,178,346 | 10/1939 | Mulch | 242/586.4 |
| 2,801,811 | 8/1957 | Dale | 242/586.4 |
| 2,915,256 | 12/1959 | Bruhn | 242/586.4 |
| 3,159,358 | 12/1964 | Joiner | 242/586.4 |
| 3,401,900 | 9/1968 | Lutz | 242/586.5 |
| 3,578,258 | 5/1971 | Heine et al. | 242/586.4 |
| 3,794,257 | 2/1974 | Reitter | 242/530.1 |

FOREIGN PATENT DOCUMENTS

| | | | |
|---|---|---|---|
| 611 628 | 4/1935 | Germany | 242/586.4 |
| 3-83773 | 4/1991 | Japan | 242/614 |
| 6-1916961 | 7/1994 | Japan | 242/532.5 |

*Primary Examiner*—John P. Darling
*Attorney, Agent, or Firm*—Majestic, Parsons, Siebert & Hsue P.C.

[57]            ABSTRACT

A take-up reel with a cylindrical core is used to wind up an elongated tape such as a container tape containing small electronic components spaced apart longitudinally at uniform intervals. After the front end of the tape is longitudinally transported to a vicinity of the core, it is compressed against the core and the reel is rotated while the front end of the tape remains thus compressed against the core.

5 Claims, 2 Drawing Sheets

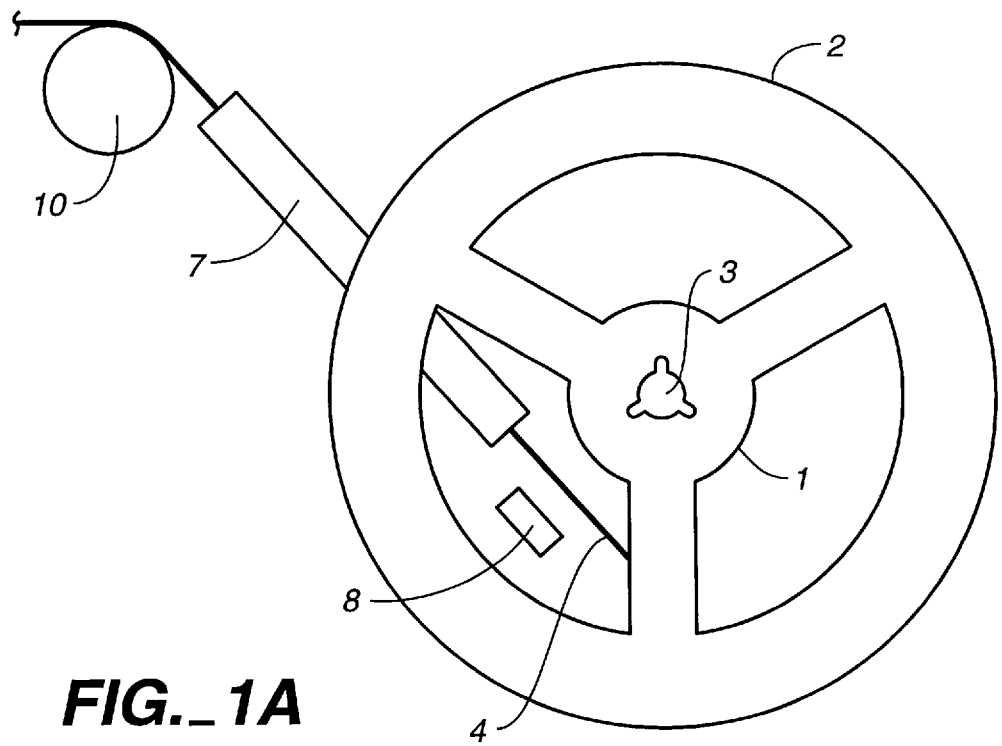
FIG._1A
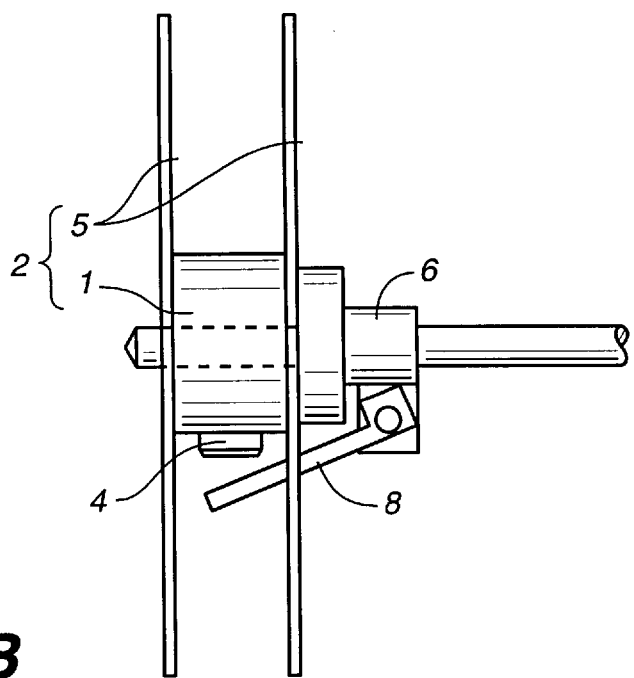
FIG._1B

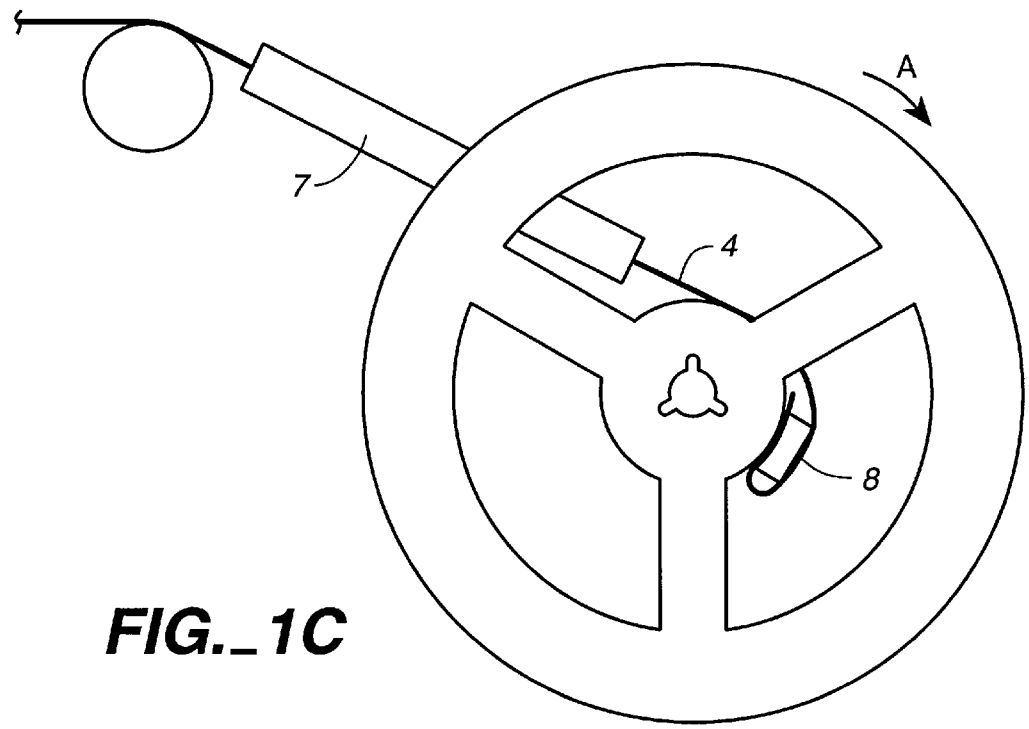
FIG._1C
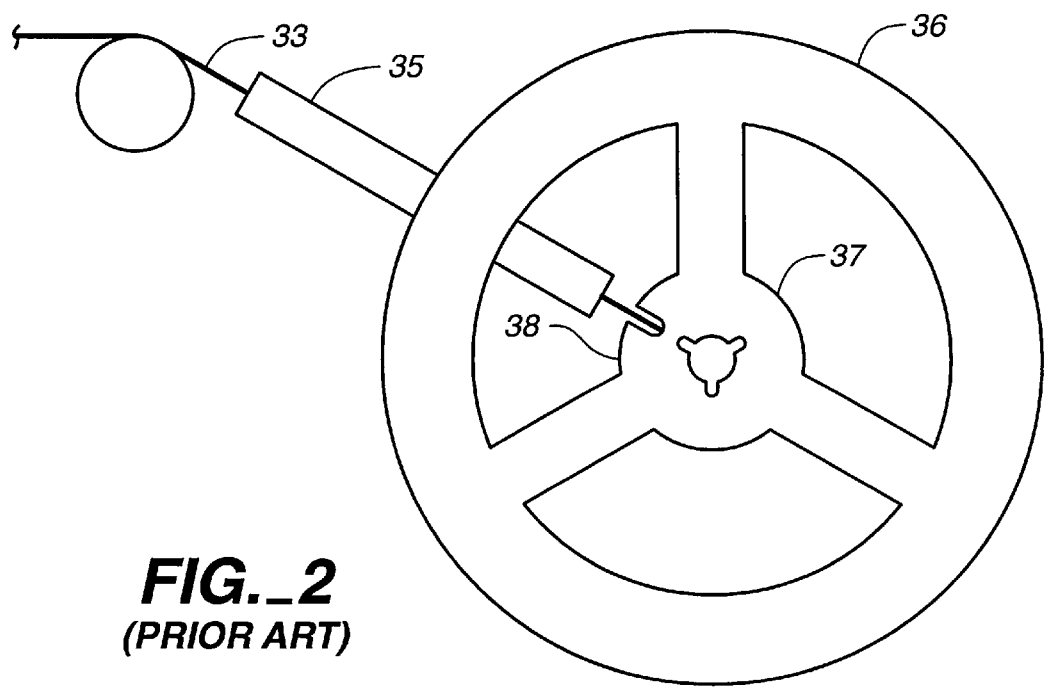
FIG._2
*(PRIOR ART)*

METHOD OF WINDING UP A TAPE AROUND A REEL

BACKGROUND OF THE INVENTION

This invention relates to a method of winding up a tape around a take-up reel. More particularly, this invention relates to a method of forming containers of articles like small electronic components by winding up a container tape around the core of a take-up reel.

In general, small electronic components such as chip resistors and ICs are packaged by inserting them individually into holes provided in an elongated container tape and, after they are covered with a cover tape, the container tape is wound up around the core of a take-up reel. FIG. 2 shows a conventional method of carrying out such a process automatically. First, a container tape 33 with electronic components (not shown) inserted individually into its holes is moved in the longitudinal direction by means of a rotary roller (not shown) and inserted into a guide rail 35 which may be approximately a rectangular parallelopiped in shape, having a hollow inner space (not shown). The end on the exit side of this guide rail 35 is preliminarily positioned near a cut 38 formed on the core 37 of a take-up reel 36. As the tape 33 is further advanced and passed through the guide rail 35, its front end is inserted into the cut 38. If the take-up reel 36 is rotated thereafter, the tape 31 is wound around the core 37.

Since the front end of the tape 33 is forcibly kept inside the cut 38 on the core 37 as the take-up reel 36 is rotated, however, it sometimes slips out of the cut 38 and the take-up reel 36 rotates without winding up the tape 33 around its core 37. If this happens, the winding-up device stops operating and the operator is required to manually insert the tape 33 into the cut 38 or to attach the tape 33 to the outer surface of the core 37 by means of an adhesive tape or the like. This affects the work efficiency of the device significantly.

SUMMARY OF THE INVENTION

It is therefore an object of this invention to provide a method of forming a container of small articles such as small electronic components by automatically winding up a container tape around the core of a take-up reel.

A method embodying this invention, with which the above and other objects can be accomplished, may be characterized as comprising the steps of transporting an article-containing elongated container tape longitudinally to the vicinity of the approximately cylindrical core of a take-up reel, compressing the front end of this tape against the core, and rotating the take-up reel while the container tape remains thus compressed.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIGS. 1A, 1B and 1C are sketches of a take-up reel at various stages of a process for winding up an article-containing container tape by a method embodying this invention; and FIG. 2 is a sketch of a take-up reel for winding up a container tape by a conventional method.

DETAILED DESCRIPTION OF THE INVENTION

The invention will be described next by way of an example wherein ICs are packaged. As shown in FIG. 1A, 1B and 1C, use is made of a take-up reel 2 having an approximately cylindrical core 1 made of foaming styrol or a corrugated cardboard to wind up around this core 1 an elongated container tape 4 containing the ICs (not shown) to produce a package. Although not shown, the container tape 4 is provided with approximately rectangular concave holes at a specified pitch in the longitudinal direction, and the ICs are individually inserted in these holes and covered with a cover tape (not shown). As shown in FIG. 1B, the take-up reel 2 has two side plates 5 made of thick paper such as a cardboard pasted on both side surfaces of the core 1, and a throughhole 3 is formed nearly at the center of the core 1. Each side plate 5 has openings through which an operator can visually ascertain the extent to which the container tape is wound around the core 1. A rotary shaft 6 which can be rotated (say, by means of a torque motor) penetrates this throughhole 3 such that the take-up reel 2 itself can rotate with this rotary shaft 6.

Proximally to the take-up reel 2 is a guide rail 7 approximately of the shape of a rectangular parallelopiped having a longitudinally elongated inner space. The guide rail 7 is rotatable around one of its end parts such that its free end can swing between the two side plates 5 of the take-up reel 2, approaching the peripheral surface of the core 1. A planar compressing member 8, rotatably supported at one end thereof by the rotary shaft 6, passes through one of the openings through one of the side plates 5, as shown in FIG. 1B so as to swing around its axially supported end and thereby move towards or away from the peripheral surface of the core 1 by means of an air cylinder (not shown). As can be understood from the figures, the compressing member 8 is adapted to rotate together with the rotary shaft 6.

The container tape 4 is perforated longitudinally (not shown) and thereby engages with a rotary roller 10 disposed near the fixed end part of the guide rail 7 such that the container tape 4 can be advanced longitudinally as the rotary roller 10 is rotated.

To package ICs, the container tape 4 is advanced longitudinally, as shown in FIG. 1A, by rotating the rotary roller 10 such that its front end enters the inner space of the guide rail 7 through its fixed end part, passes through the guide rail 7 and comes out of the guide rail 7 through its movable end part to reach the vicinity of the peripheral surface of the core 1. Unlike the operation with the conventional device shown in FIG. 2, there is no need according to this invention to make sure that the front end of the tape 4 be inserted into a narrow cut on the core 1. All that is required according to this invention is to bring the front end of the tape 4 somewhere inside the large region between the core 1 and the compressing member 8. This reduces the possibility of the front end of the tape 4 failing to smoothly reach a narrowly limited target position on the core 1 by getting stuck somewhere while being transported.

Next, the compressing member 8 is moved towards the core 1 to compress the front part of the tape 4 against the peripheral surface of the core 1, as shown in FIG. 1C, and the rotary shaft 6 is rotated in the direction of arrow A while the container tape 4 is being compressed. As a result, the tape 4 is wound around the core 1 since its front end part is firmly compressed by the compressing member 8 against the core 1. In other words, the possibility of the tape 4 becoming disengaged from the core 1 is substantially eliminated, and the tape 4 can be wound up more dependably.

It should be noted that, according to the embodiment described above with reference to FIGS. 1A, 1B and 1C, the direction of rotation of the take-up reel 2 is opposite to the direction in which the tape 4 is delivered to it (as shown in FIG. 1A). In other words, the tape 4 is folded backward by the compressing member 8 and is wound around the core 1 such that it would be difficult for it to slip out against the compressive force exerted by the compressing member 8.

After a specified length of the tape 4 has been wound up, the rotation of the take-up reel 2 is stopped and the tape 4 is cut off transversely and sealed where it is cut. Thereafter, the rotary shaft 6 is moved away and pulled away from the reel 2.

The invention has been described above with reference to only one example, but this example is not intended to limit the scope of the invention. Many modifications and variations are possible within the scope of the invention. For example, the direction of rotary motion of the take-up reel 2 need not be opposite to the direction of transportation of the container tape 4. One of the merits of the present invention is that the container tape need not be inserted into a narrow cut formed on the core. Another merit of the invention is that the container tape does not come off easily from the core because it is securely compressed by the compressing member.

What is claimed is:

1. A method of winding up a tape around a take-up reel, said method comprising the steps of:

providing a take-up reel having a substantially cylindrical core with a peripheral surface;

transporting an elongated tape longitudinally to a vicinity of said peripheral surface of said core;

rotating a holding member rotatably attached to said core and thereby compressing a front end part of said transported tape between said holder member and said peripheral surface of said core; and rotating said take-up reel while said tape is compressed against said core.

2. The method of claim 1 wherein said take-up reel is rotated in a direction which is opposite to the direction in which said tape is transported towards said take-up reel.

3. The method of claim 1 wherein said tape contains articles which are longitudinally spaced apart with respect to said tape.

4. A device for winding up a tape around a core of a reel having plates which sandwich said core therebetween, said device comprising:

guiding means for guiding said tape towards said core a rotary shaft capable of causing said core to rotate therewith, and holding means rotatably attached to said rotary shaft for holding an end part of said tape between said holding means and a peripheral surface of said core.

5. The device of claim 4 wherein said core has a through-hole for accepting said rotary shaft therein to engage therewith.

* * * * *